(12) United States Patent
Chikuma

(10) Patent No.: US 6,716,331 B2
(45) Date of Patent: Apr. 6, 2004

(54) ELECTROLYSIS METHOD AND APPARATUS

(76) Inventor: Toichi Chikuma, 11-9-703, Sendagaya 4-chome, Shibuya-ku, Tokyo (JP)

( * ) Notice: Subject to any disclaimer, the term of this patent is extended or adjusted under 35 U.S.C. 154(b) by 263 days.

(21) Appl. No.: 09/903,481

(22) Filed: Jul. 12, 2001

(65) Prior Publication Data
US 2002/0005358 A1 Jan. 17, 2002

(30) Foreign Application Priority Data
Jul. 13, 2000 (JP) ........................................ 2000-212893

(51) Int. Cl.[7] ................................................ C25D 5/00
(52) U.S. Cl. ..................... 205/89; 205/339; 204/224 R; 204/267; 204/DIG. 7; 204/230.2; 204/252
(58) Field of Search ............... 205/89, 339; 204/224 R, 204/267, DIG. 7, 230.2, 252

(56) References Cited
U.S. PATENT DOCUMENTS
4,049,528 A * 9/1977 Morel et al. ................ 205/347
5,423,967 A * 6/1995 Kunimatsu et al. ......... 600/109

* cited by examiner

Primary Examiner—Wesley A. Nicolas
(74) Attorney, Agent, or Firm—Sughrue Mion, PLLC

(57) ABSTRACT

An electrolytic method is disclosed by which occlusion of hydrogen or sticking of atoms or molecules in plating and so forth is not disturbed by electronic magnetic force produced by main electric current and ion current flowing from the positive electrode to the negative electrode through electrolyte. An electric circuit separate from a positive electrode and a negative electrode is provided between the positive electrode and the negative electrode, and electric current of a direction opposite to that of main electric current and ion current flowing in the electrolyte from the positive electrode to the negative electrode is supplied to the electric circuit to produce an opposite magnetic field which cancels a magnetic field produced by the main electric current and the ion current flowing in the electrolyte.

7 Claims, 3 Drawing Sheets

ELECTROLYSIS METHOD AND APPARATUS

BACKGROUND OF THE INVENTION

1. Field of the Invention

The present invention relates to an electrolysis method and apparatus wherein a positive electrode and a negative electrode are immersed in electrolyte to cause electrolysis to occur so that atoms or molecules may be occluded into or stick to the negative electrode or/and the positive electrode.

2. Description of the Related Art

An electrolysis apparatus typically has such a configuration as schematically shown in FIG. 1. Referring to FIG. 1, a positive electrode 1 and a negative electrode 2 are immersed in electrolyte 3 so that atoms or molecules are occluded into or stick to the negative electrode 2 or/and the positive electrode 1 by electrolysis. In the electrolysis apparatus, main electric current and ion current by ions flow from the positive electrode 1 to the negative electrode 2 through the electrolyte 3. If the currents are regarded as an electric current flux as seen in FIG. 2, a circular electric field is generated in accordance with the Fleming's left-hand rule by the electric current flux, and electromagnetic force directed perpendicularly toward the center axis of the electric current flux is generated by the magnetic field. Here, where the current density is represented by J and the magnetic flux density is represented by B, the electromagnetic force F is given by $F = J \times B$.

Now, if it is assumed that the electrolysis apparatus is utilized to occlude hydrogen into a hydrogen occluding substance such as palladium used for the negative electrode, then since hydrogen atomic nuclei have the positive charge, they are acted upon by the electromagnetic force F and movement thereof toward the hydrogen occluding substance such as palladium of the negative electrode is disturbed. As a result, occlusion of the hydrogen atomic nuclei into the hydrogen occluding substance is suppressed. This similarly applies to plating or the like.

SUMMARY OF THE INVENTION

It is an object of the present invention to provide an electrolytic method and apparatus by which occlusion of hydrogen or sticking of atoms or molecules in plating and so forth is not disturbed by electronic magnetic force generated by main electric current and ion current flowing from the positive electrode to the negative electrode through electrolyte.

In order to attain the object described above, according to an aspect of the present invention, there is provided an electrolysis method wherein a positive electrode and a negative electrode are immersed in electrolyte in an electrolysis tank to cause electrolysis to occur, comprising the step of applying an opposite magnetic field for canceling a magnetic field produced by main electric current and ion current flowing in the electrolyte from the positive electrode to the negative electrode.

Electric current of a direction opposite to that of the main electric current and the ion current flowing in the electrolyte from the positive electrode to the negative electrode may be supplied to an electric circuit provided between but separate from the positive electrode and the negative electrode to produce the opposite magnetic field which cancels the magnetic field produced by the main electric current and the ion current flowing in the electrolyte.

As an alternative, the opposite magnetic field which cancels the magnetic field produced by the main electric current and the ion current flowing in the electrolyte may be produced using a permanent magnet or an electromagnet.

Preferably, an electric field is increased by an auxiliary positive electrode coated with an electric insulating material and disposed at a position in the proximity of the positive electrode remote from the negative electrode.

The negative electrode may be made of a hydrogen occluding substance and occludes hydrogen atomic nuclei.

According to another aspect of the present invention, there is provided an electrolysis method wherein a positive electrode and a negative electrode are immersed in electrolyte in an electrolysis tank to cause electrolysis to occur, comprising the step of using, as the electrolysis tank, an electrolysis tank which is partitioned into a positive electrode tank and a negative electrode tank by an electrically insulating nonmagnetic partition having an opening through which the electrolyte can communicate between the positive electrode tank and the negative electrode tank and in which the positive electrode is disposed in the positive electrode tank and the negative electrode is disposed in the negative electrode tank to perform electrolysis wherein main electric current and ion current flowing in the electrolyte from the positive electrode through the opening to the negative electrode flows in the opposite directions to each other at a place from the positive electrode to the opening and another place from the opening to the negative electrode across the partition thereby to produce magnetic fields which cancel each other.

With the electrolysis methods and also electrolysis apparatus by which the electrolysis methods are carried out, an opposite magnetic field for canceling a magnetic field produced by main electric current and ion current flowing in the electrolyte from the positive electrode to the negative electrode is applied to cancel electromagnetic force acting in a direction toward the center of the magnetic field. Consequently, occlusion of hydrogen or sticking of molecules (plating) is not disturbed by such electromagnetic force, and therefore, the hydrogen occlusion efficiency, the plating efficiency, the hydrogen gas production efficiency or the like efficiency is improved.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
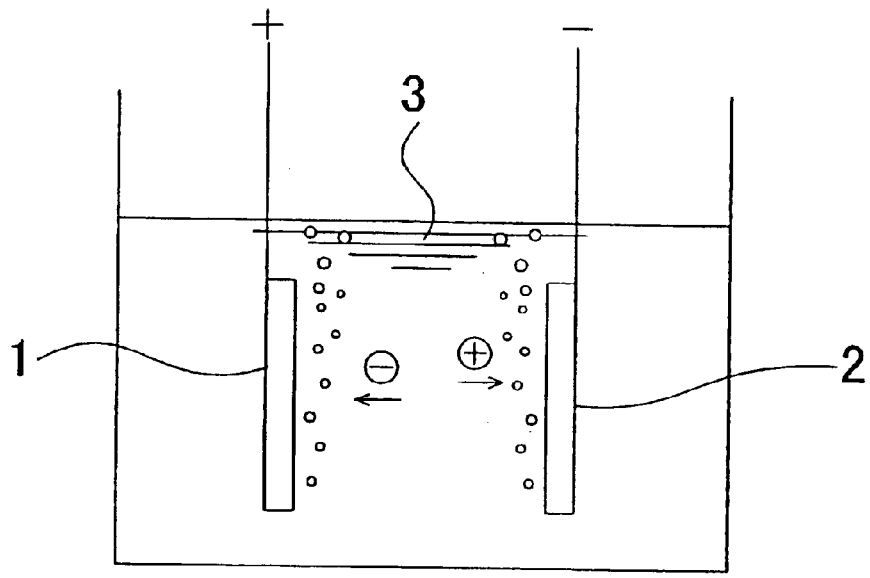
FIG. 1 is a schematic view showing a general configuration of an electrolysis apparatus.
Figure 2:
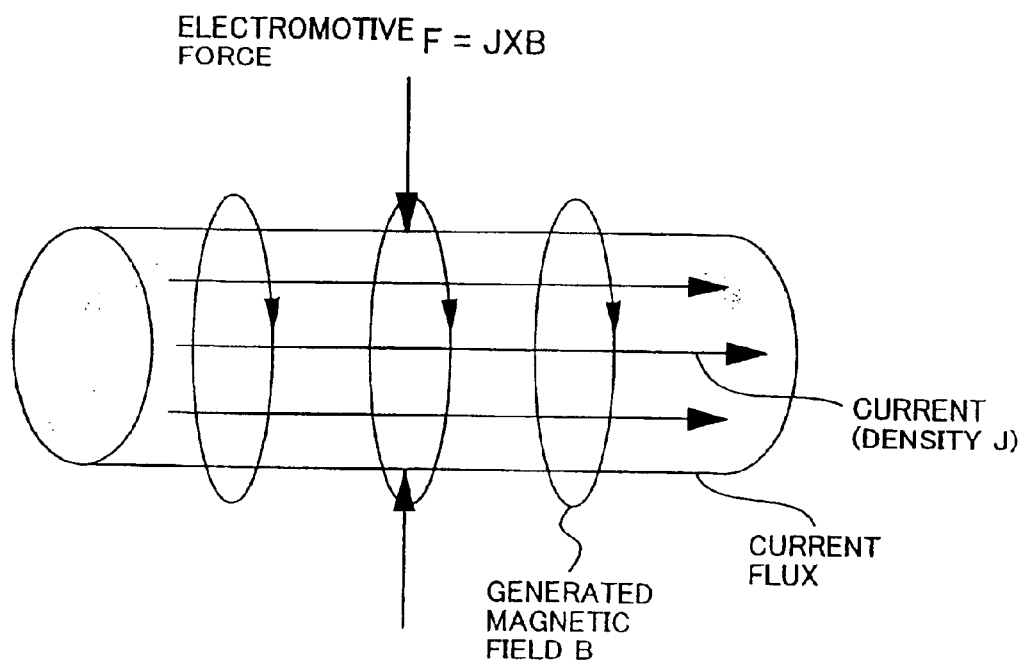
FIG. 2 is a diagrammatic view illustrating electromagnetic force generated by electric current flowing from a positive electrode to a negative electrode in electrolyte during electrolysis.
Figure 3:
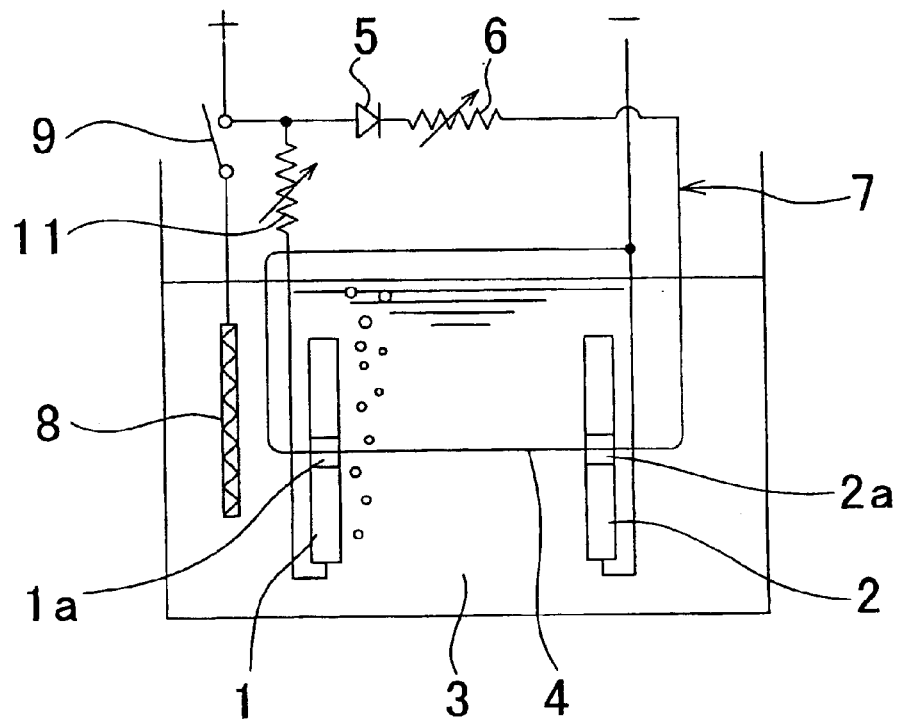
FIG. 3 is a schematic and diagrammatic view showing an electrolysis apparatus to which the present invention is applied.

Referring to FIG. 3, there is shown an electrolysis apparatus to which the present invention is applied. A positive electrode 1 and a negative electrode 2 are immersed in electrolyte 3 in an electrolysis tank 10, and a positive voltage is applied to the positive electrode 1 while a negative voltage is applied to the negative electrode 2 to perform electrolysis for occlusion or plating in the electrolysis tank 10. When such electrolysis is performed, such electromagnetic force F as illustrated in FIG. 2 is generated. Now, if it is assumed that the electrolyte 3 is heavy water or light water while the negative electrode 2 is made of a hydrogen occluding substance such as a palladium and is used to occlude hydrogen (hydrogen atomic nuclei), then since the hydrogen atomic nuclei have the positive charge, they are acted upon by the electromagnetic force F and movement thereof toward the negative electrode 2 is disturbed.

Therefore, in order to supply electric current from the negative electrode 2 side toward the positive electrode 1 side to produce a magnetic field of the opposite direction to that shown in FIG. 2 in the electrolyte 3 to cancel the electromagnetic force, a covered wire 4 is laid in the electrolyte 3 and extends through central holes 1a and 1b formed in the positive electrode 1 and the negative electrode 2 without contacting with the positive electrode 1 and the negative electrode 2, respectively. A diode 5 and a variable resistor 6 are connected in series to the covered wire 4 such that an electric circuit 7 independent of the positive electrode 1 and the negative electrode 2 is formed. Power supply to the electric circuit 7 is common to dc power supply for the positive electrode 1 and the negative electrode 2, and the direction of the current flowing in the covered wire 4 between the positive electrode 1 and the negative electrode 2 in the electrolyte 3 is the direction from the negative electrode 2 side to the positive electrode 1 side. The value of the current can be adjusted by means of the variable resistor 6. Meanwhile, the voltage to be applied to the positive electrode 1 can be adjusted by means of another variable resistor 11.

In the electrolysis apparatus having the configuration described above, when electric current flows in the covered wire 4 from the negative electrode 2 side to the positive electrode 1 side, a magnetic field is produced by the electric current. Since the direction of the magnetic field is opposite to the direction of another electric field produced by main electric current and ion current flowing in the electrolyte 3 from the positive electrode 1 to the negative electrode 2, the electromagnetic force F by the latter electric field is cancelled by the former electric field. Accordingly, the electromagnetic force F does not act upon hydrogen atomic nuclei any more, and consequently, occlusion of hydrogen atomic nuclei into the negative electrode 2 made of a hydrogen occluding substance is performed efficiently.

Further, in order to raise the electric field by the positive electrode 1, an auxiliary positive electrode 8 coated with an electrically insulating material is disposed in the electrolyte 3 on the outer side of the positive electrode 1, that is, on the side of the positive electrode 1 opposite to the negative electrode 2. The auxiliary positive electrode 8 is connected to the dc power supply through a switch 9 so that, when the switch 9 is switched on, the positive dc voltage is applied to the auxiliary positive electrode 8. As the voltage on the positive electrode 1 side is raised by the auxiliary positive electrode 8, the electrolysis performance is improved.

Figure 4:
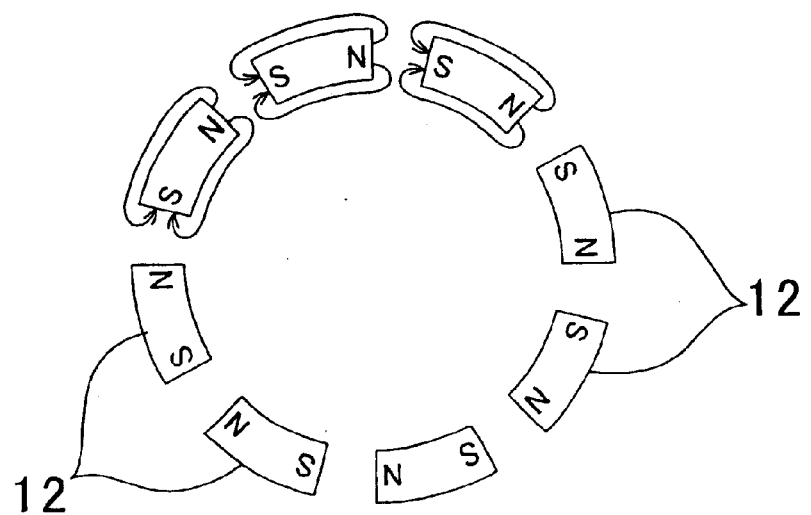
FIG. 4 is a front elevational view of an arrangement of permanent magnets where a magnetic field produced by main electric current and ion current flowing from a positive electrode to a negative electrode through electrolyte.

Alternatively, a plurality of permanent magnets 12 may be arranged annularly around the center line of the positive electrode 1 and the negative electrode 2 as seen in FIG. 4 between the positive electrode 1 and the negative electrode 2 so that the magnetic field generated by main electric current and ion current flowing in the electrolyte 3 from the positive electrode 1 to the negative electrode 2 may be canceled by the electric field produced by magnetic force of the permanent magnets 12. The permanent magnets 12 may be replaced by electromagnets.

Figure 5:
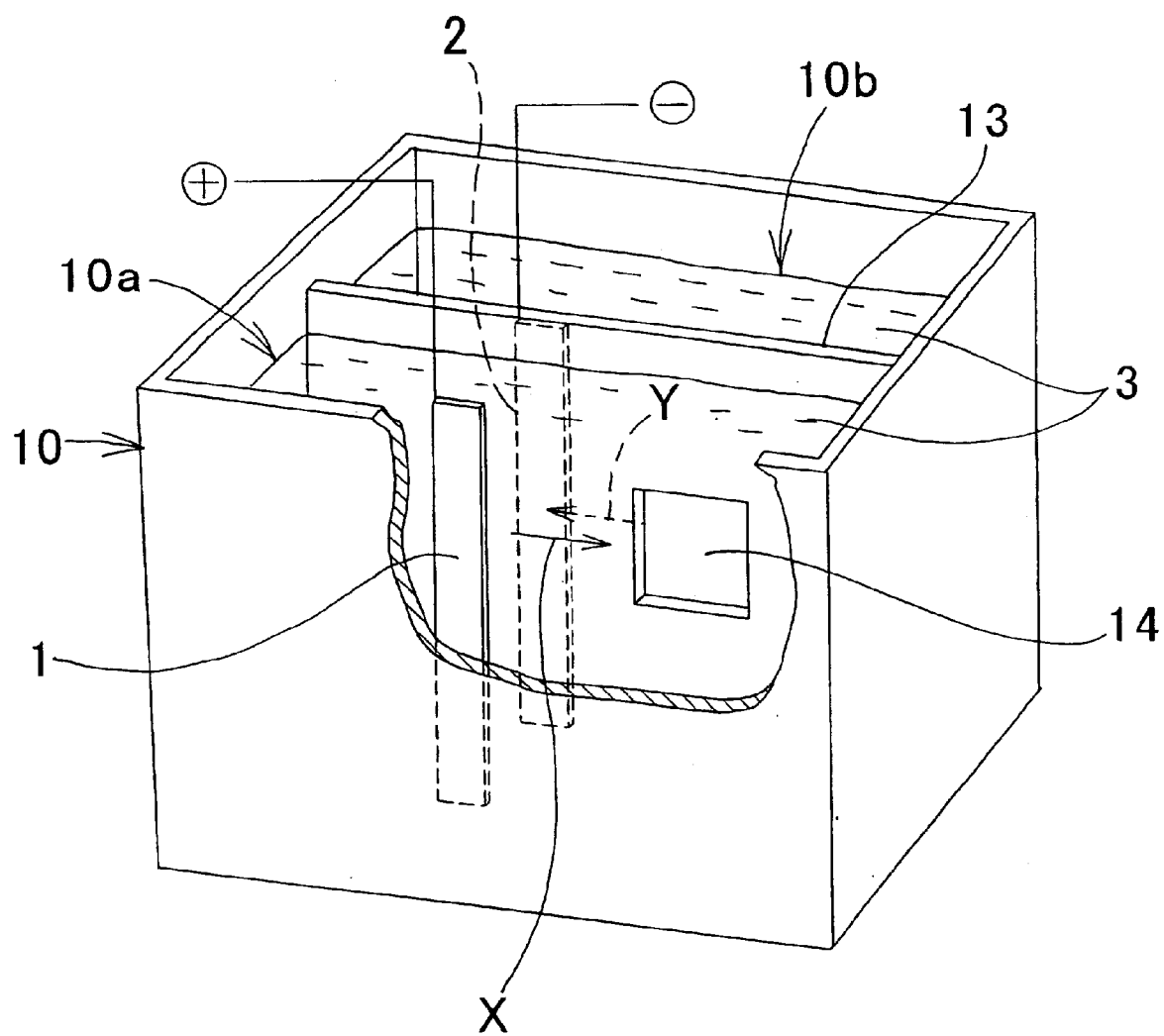
FIG. 5 is a perspective view, partly broken, showing another electrolysis apparatus to which the present invention is applied and wherein an electrolysis tank is partitioned into a positive electrode tank and a negative electrode tank by a partition.

Another electrolysis apparatus to which the present invention is applied is shown in FIG. 5. Referring to FIG. 5, the electrolysis apparatus shown is a modification to the electrolysis apparatus described above with reference to FIG. 3. In the electrolysis apparatus shown, the electrolysis tank 10 is partitioned into a positive electrode tank 10a and a negative electrode tank 10b by an electrically insulating non-magnetic partition 13, and the positive electrode 1 and the negative electrode 2 are disposed separately in the positive electrode tank 10a and the negative electrode tank 10b, respectively, in an opposing relationship to each other with the partition 13 interposed therebetween. The partition 13 has an opening 14 formed at a position thereof displaced from an area across which the positive electrode 1 and the negative electrode 2 are opposed to each other. The opening 14 allows communication of the electrolyte 3 there through between the positive electrode tank 10a and the negative electrode tank 10b.

In the electrolysis apparatus shown in FIG. 5, since electrolysis which occurs between the positive electrode 1 and the negative electrode 2 is effected through the opening 14 of the partition 13, main electric current and ion current flowing in the electrolyte 3 from the positive electrode 1 to the negative electrode 2 passes through the opening 14. The flow of the main electric current and the ion current is directed as indicated by a solid line arrow mark X within a range from the positive electrode 1 to the opening 14 and then directed as indicated by a broken line arrow mark Y within another range from the opening 14 to the negative electrode 2, and the directions of the flow are opposite to each other across the partition 13. Accordingly, the magnetic field produced by the main electric current and the ion current flowing in the direction indicated by the arrow mark X and the magnetic field produced by the main electric current and the ion current flowing in the direction indicated by the arrow mark Y are directed in the opposite directions to each other and therefore cancel each other. Consequently, an influence of electromagnetic force can be eliminated. Gas produced by the positive electrode tank 10a and gas produced by the negative electrode tank 10b are collected separately.

The present invention can be applied not only to the technique for occlusion of hydrogen using electrolysis but also to any other technique which utilizes electrolysis such as electroplating. Further, according to the present invention, since a magnetic field produced by main electric current and ion current is canceled, the electrolysis efficiency is improved, and consequently, since the voltage and the current can be increased when compared with those in the prior art, a greater amount of hydrogen gas, oxygen gas or the like can be obtained. Furthermore, where a carbon type substance is used for the negative electrode, a large amount of hydrocarbon type gas can be obtained by reaction of the carbon, and where sea water (3% water solution of NaCl) is used for the electrolyte, a large amount of ethylene type gas and oxygen can be obtained, which contributes also to production of less expensive fuel than gasoline or natural gas. Further, also where palladium is used for the negative electrode and seawater in which a small amount of heavy water is mixed is used for the electrolyte, according to the present invention, a sufficient amount of hydrogen atomic nuclei can be occluded into the negative electrode. Furthermore, if the electrolysis apparatus of the present invention is used afloat on the sea and the sea water is used as the electrolyte, then a large amount of ethylene type gas and oxygen can be produced on the sea.

While preferred embodiments of the present invention have been described using specific terms, such description is for illustrative purposes only, and it is to be understood that changes and variations may be made without departing from the spirit or scope of the following claims.

What is claimed is:

1. An electrolysis method wherein a positive electrode and a negative electrode are immersed in electrolyte in an electrolysis tank to cause electrolysis to occur, comprising the step of:

applying an opposite magnetic field for canceling a magnetic field produced by main electric current and ion current flowing in the electrolyte from said positive electrode to said negative electrode, wherein an electric field is increased by an auxiliary positive electrode coated with an electric insulating material and disposed at a position in the proximity of said positive electrode remote from said negative electrode.

2. An electrolysis method as claimed in claim 1, wherein electric current of a direction opposite to that of the main electric current and the ion current flowing in the electrolyte from said positive electrode to said negative electrode is supplied to an electric circuit provided between but separate from said positive electrode and said negative electrode to produce the opposite magnetic field which cancels the magnetic field produced by the main electric current and the ion current flowing in the electrolyte.

3. An electrolysis method wherein a positive electrode and a negative electrode are immersed in electrolyte in an electrolysis tank to cause electrolysis to occur, comprising the step of:

applying an opposite magnetic field for canceling a magnetic field produced by main electric current and ion current flowing in the electrolyte from said positive electrode to said negative electrode, wherein the opposite magnetic field which cancels the magnetic field produced by the main electric current and the ion current flowing in the electrolyte is produced using a permanent magnet or an electromagnet.

4. An electrolysis method as claimed in claim 1, wherein said negative electrode is made of a hydrogen occluding substance and occludes hydrogen atomic nuclei.

5. An electrolysis method wherein a positive electrode and a negative electrode are immersed in electrolyte in an electrolysis tank to cause electrolysis to occur, comprising the step of:

using, as said electrolysis tank, an electrolysis tank which is partitioned into a positive electrode tank and a negative electrode tank by an electrically insulating nonmagnetic partition having an opening through which the electrolyte can communicate between said positive electrode tank and said negative electrode tank and in which said positive electrode is disposed in said positive electrode tank and said negative electrode is disposed in said negative electrode tank to perform electrolysis wherein main electric current and ion current flowing in the electrolyte from said positive electrode through said opening to said negative electrode flows in the opposite directions to each other at a place from said positive electrode to said opening and another place from said opening to said negative electrode across said partition thereby to produce magnetic fields which cancel each other.

6. An electrolysis method as claimed in claim 5, wherein said negative electrode is made of a hydrogen occluding substance and occludes hydrogen atomic nuclei.

7. An electrolysis apparatus, comprising:

an electrolysis tank; and a positive electrode and a negative electrode immersed in electrolyte in said electrolysis tank to cause electrolysis to occur;

said electrolysis tank being partitioned into a positive electrode tank and a negative electrode tank by an electrically insulating nonmagnetic partition having an opening through which the electrolyte can communicate between said positive electrode tank and said negative electrode tank, said positive electrode being disposed in said positive electrode tank while said negative electrode is disposed in said negative electrode tank to perform electrolysis wherein main electric current and ion current flowing in the electrolyte from said positive electrode through said opening to said negative electrode flows in the opposite directions to each other at a place from said positive electrode to said opening and another place from said opening to said negative electrode across said partition thereby to produce magnetic fields which cancel each other.

* * * * *